United States Patent
Blinov et al.

(10) Patent No.: US 12,017,929 B2
(45) Date of Patent: Jun. 25, 2024

(54) RECRYSTALLIZATION WATER TREATMENT SYSTEM AND HEAT-EXCHANGE DEVICES (EMBODIMENTS) FOR ITS IMPLEMENTATION

(71) Applicant: LLC PRISTINAM, Moscow (RU)

(72) Inventors: Denis Dmitrievich Blinov, Moscow (RU); Evgeniy Yurievich Murinskiy, Moscow (RU)

(73) Assignee: LLC PRISTINAM (RU)

( * ) Notice: Subject to any disclaimer, the term of this patent is extended or adjusted under 35 U.S.C. 154(b) by 452 days.

(21) Appl. No.: 17/419,301

(22) PCT Filed: Dec. 26, 2019

(86) PCT No.: PCT/RU2019/001026
§ 371 (c)(1),
(2) Date: Jun. 29, 2021

(87) PCT Pub. No.: WO2020/139161
PCT Pub. Date: Jul. 2, 2020

(65) Prior Publication Data
US 2022/0073374 A1 Mar. 10, 2022

(30) Foreign Application Priority Data

| Dec. 29, 2018 | (RU) | RU2018147531 |
| Jan. 30, 2019 | (RU) | RU2019102563 |
| Jun. 27, 2019 | (RU) | RU2019120103 |

(51) Int. Cl.
*C02F 1/22* (2023.01)
*C02F 1/04* (2023.01)

(52) U.S. Cl.
CPC ............... *C02F 1/22* (2013.01); *C02F 1/043* (2013.01); *C02F 2201/005* (2013.01); *C02F 2209/02* (2013.01); *C02F 2301/046* (2013.01)

(58) Field of Classification Search
CPC ...... C02F 1/22; C02F 1/043; C02F 2201/005; C02F 2209/02; C02F 2301/046;
(Continued)

(56) References Cited

U.S. PATENT DOCUMENTS 6,658,889 B2 * 12/2003 Krylov ............... C02F 1/22
62/544

FOREIGN PATENT DOCUMENTS

| FR | 1395171 A | * | 4/1967 | |
| RU | 2557628 C2 | * | 7/2015 | |
| WO | WO-2015111405 A1 | * | 7/2015 | ............ C02F 1/22 |

* cited by examiner

*Primary Examiner* — Waqaas Ali

(57) ABSTRACT

The present invention relates to treatment systems for polluted and sea water by recrystallization and may be used in everyday life, the food industry, in the catering business and healthcare.

The system comprises at least two heat-exchange devices that contain chambers for water freezing and ice melting, cooling and heating components, a water circulation loop, a refrigerant circulation loop connected with cooling and heating components able to alternate water freezing and ice melting in the chambers of heat-exchange devices and to transfer the heat generated in the water freezing chamber into the ice melting chamber, a control and monitoring tool. Heat-exchange devices are arranged as a cascade one under another and comprise outer and inner housings as well as a cylindrical baffle, which is coaxial relatively to each other and form an annular cavity between their walls; an air supply manifold, cooling and heating components, a heating component fastened at the top of the inner housing and at least (Continued)

one drain nozzle. The outer housing is cylindrical or truncated cone-shaped with a cone angle directed upwards. The outer housing has an additional inner wall, the shape and height of which meet the outer housing while cooling and heating components are located between the said walls. The baffle and the housing internal wall may be connected to an electrical current source.

The combination of sufficiently large performance and high quality of water treatment in the system allows it to use for treating initial water with a wide range of with organic and inorganic contaminants.

7 Claims, 3 Drawing Sheets

(58) Field of Classification Search
CPC ...... C02F 2103/023; C02F 1/001; C02F 1/32; C02F 2103/08; C02F 2209/005; C02F 2209/42; C02F 11/20; Y02A 20/124; B01D 1/0088; B01D 1/28; B01D 3/007; B01D 3/02; B01D 1/0082
See application file for complete search history.

RECRYSTALLIZATION WATER TREATMENT SYSTEM AND HEAT-EXCHANGE DEVICES (EMBODIMENTS) FOR ITS IMPLEMENTATION

This technical solution relates to recrystallization water treatment systems and heat-exchange devices used in them for periodical water freezing and ice melting, in particular, to systems with two- and multi-step recrystallization layouts. It may be used in everyday life, food industry, catering business and healthcare to purify technical-grade, contaminated, saline and sea water used to produce thaw potable water.

There is a system for recrystallization water treatment (Pat. No. EA024321, IPC-2006.01 C02F1/22, publication date 30 Sep. 2016) that comprises two heat-exchange devices, each of which contains one chamber for water freezing and ice melting, a water circulation loop connected with chambers of heat-exchange devices, a tool for water freezing and ice melting, and a control and monitoring tool.

The water circulation loop comprises a tool for initial water supply equipped with a hydraulic pump, a tool for draining polluted water concentrate, a tool for draining pure water, a tank for contaminated water concentrate, a pure water tank, a tool to supply pure water to the consumer, and a tool for draining non-used pure water.

The water circulation loop is connected with chambers of heat-exchange devices and provides a possibility of purifying water per one recrystallization cycle in each chamber. Heat-exchange devices are made as rectangular parallelepiped with a flat slotted chamber. The tool for water freezing and ice melting is made as cooling and heating thermal elements mounted on the outer surface of heat-exchange devices. The control and monitoring tool comprises the control panel with microprocessor and control boards connected with it, control valves and water level sensors. The control and monitoring tool provides a possibility to simultaneously freeze water and melt ice in chambers of heat-exchange devices. The system is intended to use in everyday life, food industry and healthcare.

The following issues prevent attaining the required technical result:
  relatively high costs for water treatment caused by non-productive losses of heat energy emitted during water freezing and ice melting in chambers of heat-exchange devices;
  relatively long process of water treatment and, correspondingly, low productivity caused by applying heat-exchange devices, in which, during initial water freezing, there are almost no convective processes that shorten ice formation period with simultaneous improvement of the formed ice quality;
  relatively poor quality of treated water caused by its production per one recrystallization cycle in each chamber, where heavy water ($D_2O$) and fine suspensions and contaminants are not removed.

All the above issues limit the system functionality.

There is a system for recrystallization water treatment (application No. WO2015111405, IPC-2006.01 C02F1/22, B01D9/04, F25B1/00, F25B40/04, publication date 30 Jul. 2015) comprising two heat-exchange devices, each of which contains two chambers for water freezing and ice melting, cooling and heating components; a water circulation loop connected with the chambers of heat-exchange devices providing a possibility of draining the pre-treated water from one chamber and its supply into another one for final treatment; a refrigerant circulation loop connected with the cooling and heating components providing a possibility of alternative water freezing and ice melting in chambers of heat-exchange devices and of transferring the refrigerant heat generated in the water freezing chamber to the ice melting one; and a control and monitoring tool connected with the said loops providing the possibility of reversing water and refrigerant streams in alternating steps of water freezing and ice melting. The water circulation loop comprises a tool for initial water supply, a tool for draining polluted water concentrate, a tool for draining pure water, a tank for polluted water concentrate, a pure water tank, and a pump to supply pure water in the said tank.

The refrigerant circulation loop contains a compressor, at least one water-cooled condenser that exchanges heat with the tank for polluted water concentrate after its drainage from heat-exchanger chambers, at least two heat-exchange recuperators, a refrigerant filter and an expansion valve connected with inlets and outlets of cooling and heating components.

The control and monitoring tool comprises a controller and control valves connected with it to reverse water and refrigerant streams in the said loops.

The following issues prevent attaining the required technical result:
  complicated design of the water circulation loop due to application of heat-exchange devices with two chambers which causes the need for tools for forced water circulation, pressure control in the loop and parallel feed into the chambers and discharge from them;
  relatively poor quality of treated water since heavy water is not removed.

The above-listed issues also limit the system functionality and increase its operating costs at the relatively poor quality of water treatment.

There is a heat-exchange device for use in a recrystallization water treatment system (Pat. No. EA 017783, IPC (2006.01) C02F 1/22, publication date 29 Mar. 2013) comprising a housing, cooling and heating components, heat-insulation enclosure, a water drain tool and a water agitator. Cooling and heating components are fastened on the outer surface of the housing; thereat, the cooling element is made as an evaporator while the heating element is made as an electrical heater. The water drain tool is made as a nozzle located at the bottom of the housing. The water agitator is made as a water pump (or mechanical agitator blades) mounted in the bottom centre.

The heat-exchange device operates alternatively in the mode of freezing contaminated water and forming pure near-wall ice on the inner surface of the housing and in the mode of melting near-wall ice with draining pure water formed into the collection tank. At the same time, contaminated water with high salt content is accumulated in the housing bottom during water freezing and discharged via the drain nozzle.

The water agitator is used during the freezing mode for more intense water cooling and for icing acceleration after forming a thin ice layer on housing walls. Polluted water agitation also promotes the removal of air bubbles and adsorbed impurities from the ice surface as well as the increase of heat exchange intensity inside the housing and bleed of dissolved impurities from the interface boundary.

Recrystallization modes are operated in the heat-exchange device of the water treatment system by the automatic control unit controlled by corresponding sensors.

The heat-exchange device is integrated into the water treatment system intended for application in everyday life, the food industry and healthcare.

The volume of contaminated water poured in the housing of the heat-exchange device is 1.5 L to 2.0 L while the volume of treated thaw water is 1.0 L to 1.3 L. The complete treatment cycle is 4.5 hours to 5.5 hours long for the said water volume including 2.0 hours to 2.5 hours for the water freezing stage and 2.5 hours to 3.0 hours for the ice melting stage.

Attaining the required technical result in the known technical solution is prevented by long water treatment process and, correspondingly, low productivity of the heat-exchange device, which is due to insignificantly expedient cavity geometry in the housing, in which energy transfer from its walls to the larger volume of contaminated water decelerates proportionally to the increase of the ice layer thickness.

There is also a heat-exchange device for application in a recrystallization water treatment system (Pat. No. EA025716, IPC(2006.01) C02F 1/22, C02F 9/02, C02F 103/04, publication date 30 Jan. 2017) comprising the outer and inner housings, cooling and heating elements and a drain nozzle.

The said housings are made as a truncated cone with a cone angle directed upwards; they are located coaxially relatively to each other and form a slotted cavity between their walls. The outer housing may be tightly sealed by a cover. The inner housing is made with closed end faces and is fastened on the cover forming the gap between its lower end face and the bottom of the outer housing.

The bottom is dome-shaped with a decrease from the walls to the centre, where the drain nozzle is located. Cooling and heating components are fixed on the external surface of the outer housing and are covered with thermal insulation.

This heat-exchange device also operates alternatively in the polluted water freezing mode building pure near-wall ice up on the inner surface of the outer housing and in the near-wall ice melting mode with discharging the formed treated water through the drain nozzle.

This heat-exchange device features the formation of a water layer in the slotted cavity between the walls of the outer and inner housings. The outer housing wall cools in the freezing mode by cooling components.

When its temperature decreases to −3 . . . −4° C., water in the slotted cavity is cooled rapidly (within 3 to 5 minutes), simultaneously forming crystallization front directed toward the inner housing wall.

At the same time, water is not mixed in bulk in the slotted cavity due to a significant decrease of convective streams.

After discharging the liquid impurity concentrate via the nozzle, cooling components are switched off while heating elements are switched on, ensuring thawing of the annular ice layer on the outer housing wall with a subsequent discharge of pure thaw water into the collection tank via the nozzle.

The outer housing made as a truncated cone with a cone angle directed upwards increases the efficiency of heat transfer processes and provides a firm contact of the ice layer with the outer hosing wall during the thawing stage, thus increasing the device productivity and treated water quality.

Using a slotted cavity between walls of the external and inner housings for water freezing allows to narrow the area, in which an annular crystallization front of polluted water is formed, and to decrease the freezing mode duration. The complete cycle of treatment of contaminated water in the heat-exchange device lasts no more than 4.0 hours; at the same time, the volume of treated water is at least 66% to 80% of the polluted water volume, while the content of inorganic impurities decreases at least by 2.5 times.

The abovementioned design features of the heat-exchange device allowed increasing its productivity by 25% on average compared with the device according to Pat. No. EA017783 at the approximately equal percent of treated thaw water output.

The heat-exchange device is used in water treatment systems containing, for example, an automatic control unit connected with sensors for freezing and thawing parameters control. These systems are intended to use in everyday life, the food industry and healthcare.

The achievement of the required technical result in the known technical solution as well as in the technical solution described in Pat. No. EA017783 is prevented by the relatively long water treatment process and, correspondingly, low performance due to almost full absence of convective processes in contaminated water in the slotted cavity during the freezing stage.

At the same time, the thawing mode duration changes insignificantly as compared with the device described in Pat. No. EA017783. Besides, the absence of convective processes in polluted water significantly decreases the quality of ice formed on the outer housing wall and, correspondingly, the quality of the treated thaw water. The above-mentioned shortages of the known technical solutions significantly limit the scope of their application in water treatment systems.

The task, to solve which the claimed technical solution is intended, is to improve the recrystallization water treatment system by a different design of heat-exchange devices and water and refrigerant circulation loops connected with them, control and monitoring tools, which ensure expansion of the system functionality and enhancement of productivity at a relatively low operating cost.

The technical result achieved due to implementation of the assigned task in a recrystallization water treatment system is shortening of steps of initial water freezing and ice melting due to a different layout of heat-exchange devices in the system, a different design of chambers for water freezing and ice melting in them, and a different connection with water and refrigerant circulation loops as well as with control and monitoring tools.

The said technical result is achieved by simultaneous simplification of the water circulation loop, improvement of water quality and reduction of operating costs for water treatment. Generally, the claimed technical result allows expansion of the system functionality.

The assigned task is solved, and the technical result is achieved as the recrystallization water treatment system contains at least two heat-exchange devices with chambers for water freezing and ice melting, cooling and heating components, a water circulation loop, which is connected with the chambers of the heat-exchange devices with the possibility of draining pre-treated water from one chamber and its supply into another for final treatment; a refrigerant circulation loop connected with cooling and heating components able to alternatively freeze water and melt ice in chambers of the heat-exchange devices and to transfer the heat of refrigerant formed in the chamber during water freezing into the ice melting chamber; and the control and monitoring tool connected with the water and refrigerant circulation loops able to reverse water and refrigerant streams during alternating water freezing and ice melting stages; thereat, the water circulation loop contains a tool for the initial water supply, a tool for draining polluted water concentrate, a tool for draining pre-treated water, a tool for draining treated water, a pure water tank, and the tank for polluted water concentrate; and the refrigerant circulation loop contains a compressor, a water-cooled condenser that exchanges heat with the tank for polluted water concentrate after its draining from chambers of heat-exchange devices, and two heat exchangers; according to the technical solution, heat-exchange devices are cascaded one under another, and each device contains one chamber with the possibility to divide it into intercommunicated cooling and recirculation cavities; and with the possibility for water to circulate between the said cavities forming equipotential surfaces in the cooling cavity during water freezing; the refrigerant circulation loop contains an additional air-cooled condenser, the inlet and outlet of which are connected with the compressor outlet and with the inlet of the water-cooled condenser, correspondingly; thereat, the inlet of the first heat exchanger is connected with inlets and outlets of cooling and heating components while its outlet is connected with the inlet of the second heat exchanger, the outlet of which exchanges heat with the pure water tank and connected with the compressor inlet; the chamber of the upper heat-exchange device is connected at the inlet with the tool for the initial water supply and at the outlet it is connected with the tool for draining polluted water concentrate and the tool for draining the pre-treated water; the chamber of the lower heat-exchange device is connected at the inlet with the tool for draining the pre-treated water from the chamber of the upper heat-exchange device and at the outlet it is connected with the tool for draining polluted water concentrate and the tool for draining pure water.

In the system for recrystallization water treatment, the control and monitoring tool may be able to separate initial water in the chamber of the upper heat-exchange device into heavy and light water; heavy water is removed via the tool for draining polluted water concentrate while light water is supplied in the chamber of the lower heat-exchange device via the tool for draining pre-treated water.

The control and monitoring tool in the recrystallization water treatment system may comprise a controller and control valves installed in water and refrigerant circulation loops and connected to the controller, temperature sensors installed at inlets and outlets of cooling and heating components and inside the pure water tank, and a water level sensor installed inside the pure water tank; thereat control valves may be water and refrigerant solenoid valves.

The recrystallization water treatment system may comprise a heat-exchange accumulator that exchanges heat with initial water when it is supplied into the chamber of the upper heat-exchange device and with polluted water concentrate and pure water when they are supplied from the chamber of the lower heat-exchange device while the water-cooled condenser may additionally exchange heat with pure water when it is supplied from the heat-exchange accumulator.

The tool for initial water supply in the recrystallization water treatment system may contain, upstream the chamber of the upper heat-exchange device, a heat-exchange component that is located in the thermal accumulator, and the coarse filter; the tool for draining polluted water concentrate may contain, downstream the chamber of the upper heat-exchange device, the tank for polluted water concentrate, and this tank exchanges heat with the water-cooled condenser, and the drain nozzle; the tool for draining polluted water concentrate and the tool for draining pure water may have a common outlet from the chamber of the lower heat-exchange device and have a common heat-exchange component downstream the said chamber in the heat-exchange accumulator. Then, along the path of polluted water concentrate, they contain the said tank for polluted water concentrate and a drain nozzle; along the pure water path, they contain the second heat-exchange component located in the water-cooled condenser, a fine filter and a sterilization lamp; and the pure water tank contains the shut-off valve to control water supply to a consumer.

The task, which the claimed technical solution is intended to solve, regarding the first and second embodiments for the recrystallization water treatment system, is to improve the design of the heat exchange device due to separation of the annular cavity between the outer and inner housings into the cooling and recirculation zones, implementation of tools to intensify convective processes in the annular cavity during water freezing and a different location of cooling and heating components which improves the productivity of the heat exchange device.

The technical result achieved after implementing the assigned task in relation to the first and the second embodiments of the heat-exchange device is manifested in shortening of the polluted water freezing and ice melting steps with simultaneous increase of water treatment quality.

The assigned task is solved, and the technical result is achieved as in the first embodiment of the heat-exchange device for the recrystallization water treatment system, which contains the outer and inner cylindrical housings, cooling and heating components, the said housings are installed coaxially relative to each other forming an annular cavity between their walls; thereat, the inner housing is made with closed end faces while the outer housing may be tightly closed with a cover and is equipped with a drain nozzle. According to the claimed technical solution, the heat-exchange device is equipped with a cylindrical baffle located between the outer and inner housings, forming cooling and recirculation cavities that intercommunicate between each other under the baffle and over it; an air manifold installed on the outer housing bottom in the cooling cavity, and a heating component located at the top of the inner housing; thereat, the inner housing height corresponds to the outer housing height; the outer housing is made with an additional cylindrical inner wall, and cooling and heating components are located between the said wall and the outer housing wall.

The ratio of the outer housing height to its diameter is 1.5 to 1.7 in the first embodiment of the heat-exchange device used in the recrystallization water treatment system.

The height of the additional inner wall of the cylindrical housing corresponds to the outer housing height in the first embodiment of the heat-exchange device for the recrystallization water treatment system.

The assigned task is solved, and the technical result is achieved as in the second embodiment of the heat-exchange device for the recrystallization water treatment system, which contains the truncated cone-shaped outer housing with a cone angle directed upwards, the inner housing, which is located inside the outer one along its longitudinal axis, forms a cavity between their walls and has closed end faces, cooling and heating components located on the outer housing, a drain nozzle and a cover to lock the outer housing. According to the claimed technical solution, the heat-exchange device is equipped with a cylindrical baffle. The baffle is installed in the cavity between the walls of the inner and outer housings and forms cooling and recirculation cavities that intercommunicate between each other under the baffle and over it, an air supply manifold and a heating component, thereat, the inner housing is cylindrical, the baffle is located coaxially with the outer and inner housings, the air supply manifold is installed on the outer housing bottom in the cooling cavity while the heating component is installed at the top of the inner housing, the height of the inner housing corresponds to the outer housing height.

In the second embodiment of the heat-exchange device for the recrystallization water treatment system, the outer housing has an additional inner wall, the shape and height of which correspond to the outer housing while cooling and heating components are located between the said walls.

In both the first and the second embodiments of the heat-exchange device for the recrystallization water treatment system, the height of the baffle is 0.8 to 0.9 of the height of the outer housing.

In both the first and the second embodiments of the heat-exchange device for the recrystallization water treatment system, the baffle and the inner wall of the housing may be connected to the electric power source.

The technical solution is explained by the drawings, where:

Figure 1:
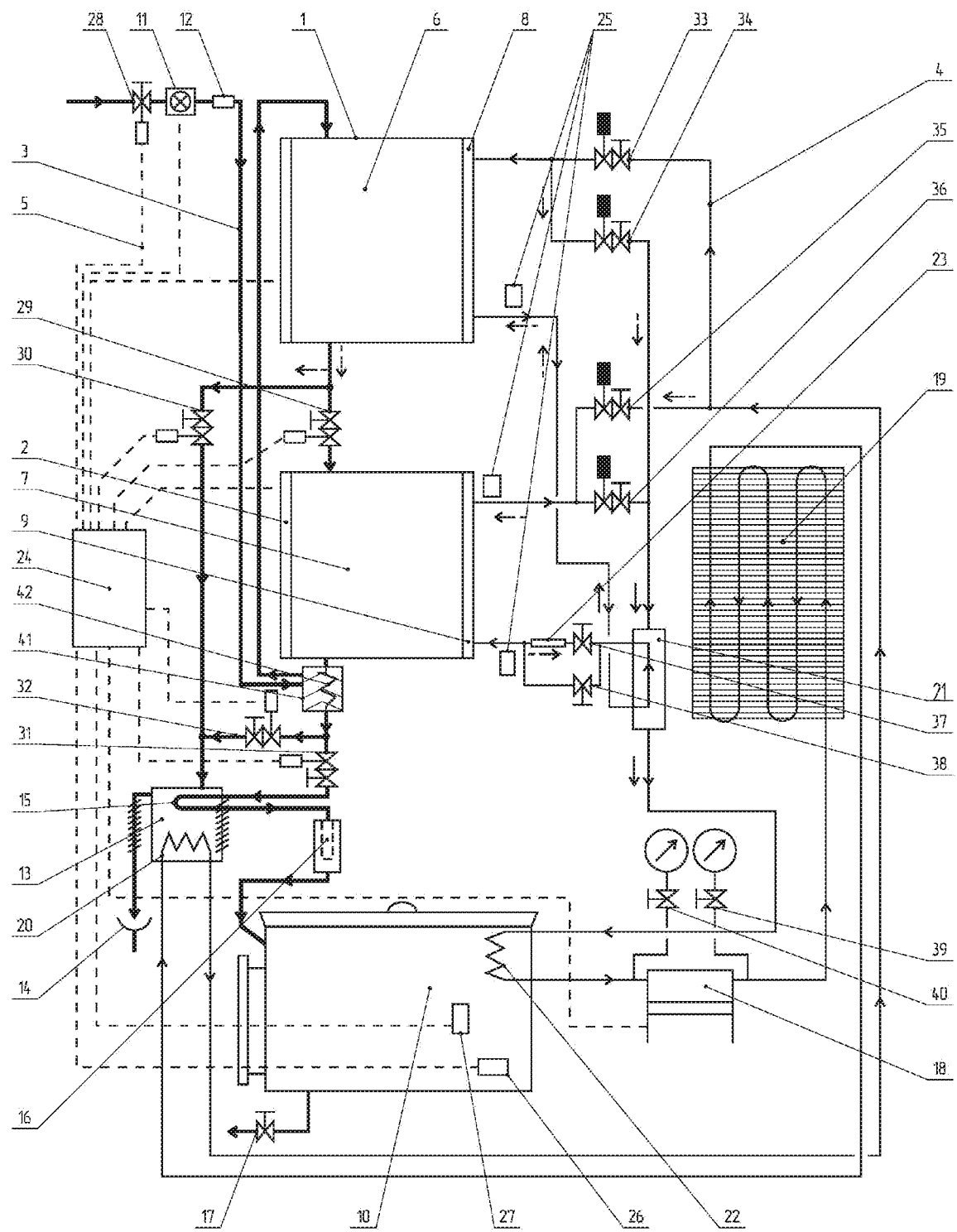
FIG. 1 depicts a schematic diagram of the recrystallization water treatment system.

The recrystallization water treatment system comprises (FIG. 1) upper and lower heat-exchange devices 1 and 2 cascaded relatively to each other, water circulation loop 3 (shown as solid thick lines), refrigerant circulation loop 4 (shown as solid thin lines), and control and monitoring tools 5 (shown as dashed lines).

Heat-exchange devices 1 and 2 (shown in simplified form) comprise chambers 6 and 7 for alternating water freezing and ice melting, correspondingly, as well as cooling and heating components 8 and 9.

The water circulation loop 3 contains a tool 6 for initial water supply into the chamber, a tool to drain polluted water concentrate from chambers 6 and 7, a tool to drain pre-treated water from chamber 6 into the chamber 7, a tool to drain polluted water concentrate from chambers 6 and 7, a tool to drain pure water from the chamber 7 and a pure water tank 10. The said tools are made as pipe sections (not specified) with the instruments mounted in them.

The tool for initial water supply into chamber 6 comprises a sterilization lamp 11 and a coarse filter 12. The tool to drain polluted water concentrate from chambers 6 and 7 comprises the tank 13 for polluted water concentrate, which exchanges heat with the refrigerant circulation loop 4, and the drain nozzle 14.

The draining tool for pre-treated water from the chamber 6 into the chamber 7 is made as a branch of the tool for draining polluted water concentrate from chamber 6.

The tool for draining pure water from the chamber 7 comprises the heat-exchange component 15 made as a coil or a ribbed tube, which is installed in the tank for polluted water concentrate 13, and a fine filter 16. The tank 10 is equipped with a shut-off valve 17 to control the pure water supply to a consumer.

The refrigerant circulation loop 4 comprises cooling and heating components 8 and 9 that exchange heat with chambers 6 and 7, correspondingly, the compressor 18, the outlet of which is connected sequentially with the air-cooled condenser 19 and the water-cooled condenser 20, and heat exchangers 21 and 22.

The heat exchanger 21 is connected at the inlet with inlets and outlets (not shown) of cooling and heating components 8 and 9 and at the outlet it is connected with the inlet of the heat exchanger 22, that exchanges heat with the pure water tank 10. The output of the heat exchanger 22 is connected, in turn, with the compressor 18. In addition, the throttling capillary tube 23 is installed at the inlet of cooling and heating components 9.

The water-cooled condenser 20 exchanges heat with the tank 13 for polluted water concentrate and the heat-exchange component 15. The refrigerant circulation loop 4 is connected with cooling and heating components 8 and 9 with a possibility of alternative water freezing and ice melting in chambers 6 and 7 and transfer of refrigerant heat generated in the chamber during water freezing into the ice melting chamber.

The control and monitoring tool 5 contains the controller 24 with the control panel (not shown) and temperature sensors 25 and 26 connected with it and installed at inlets and outlets of cooling and heating components 8 and 9, correspondingly, and inside tank 10; water level sensor 27 installed inside the said tank 10, and solenoid valves mounted in the water circulation loop 3 and the refrigerant circulation loop 4.

The following components are installed in the water circulation loop 3: the valve 28 to control the initial water supply into the heat-exchange chamber 6, valves 29 and 30 to separate draining of polluted water concentrate and pre-treated water from chamber 6, valves 31 and 32 to separate drainage of polluted water concentrate and pure water from the chamber 7.

The following components are installed in the refrigerant circulation loop 4: valves 33 to 37 to reverse refrigerant streams in cooling and heating components 8 and 9 during alternating modes of water freezing and ice melting; the temperature control valve 38 to adjust the refrigerant temperature (increase or decrease) according to the system operating algorithm, and valves 39 and 40 to control refrigerant pressure at the inlet and the outlet of the compressor 18.

The system also contains a heat-exchange cold accumulator 41 in the water circulation loop 3. It is installed under the lower heat-exchange device 2 and exchanges heat with the initial water when it is supplied downstream the coarse filter 12 into the chamber 6 of the upper heat-exchange device 1 and with a cold concentrate of polluted water and pure water when they are supplied from the chamber 7 of the lower heat-exchange device 2.

The heat-exchange cold accumulator 41 is made as a closed heat-insulated tank filled with non-freezing heat-conducting substance, inside which heat-exchange components 42 are installed, for example, as a coil, to supply initial water into the chamber 6 and to discharge alternatively polluted water concentrate and pure water from the chamber 7.

At the same time, the water-cooled condenser 20 exchanges heat with pure water after its discharge from the heat-exchange cold accumulator 41.

Use of the heat-exchange cold accumulator 41 for pre-cooling of initial water allows decreasing the system power consumption up to 5%.

The system is controlled automatically via the control panel by the controller 24. According to the set algorithm, the controller 24 provides the following system functions:

reversing water and refrigerant streams during alternating modes of water freezing and ice melting;

separation of flows of polluted water concentrate, pre-treated water and pure water at the outlet of chambers in the upper and lower heat-exchange devices;

transfer of refrigerant heat generated in the chamber during water freezing into the ice melting chamber;

water treatment with removal of heavy water in the chamber of the upper heat-exchange device, disposal of heavy water and purification of light water from impurities and dissolved salts in the chamber of the lower heat-exchange device;

cooling of pure water in the tank during its storage and use;

production of transparent consumer ice from purified water;

increasing the concentration of liquid foods, wine and juices.

Technical parameters of the claimed recrystallization water treatment system, including productivity, power consumption, dimensions and functionality, depend significantly upon the design of heat-exchange devices 1 and 2, where recrystallization processes occur during water treatment.

Figure 2:
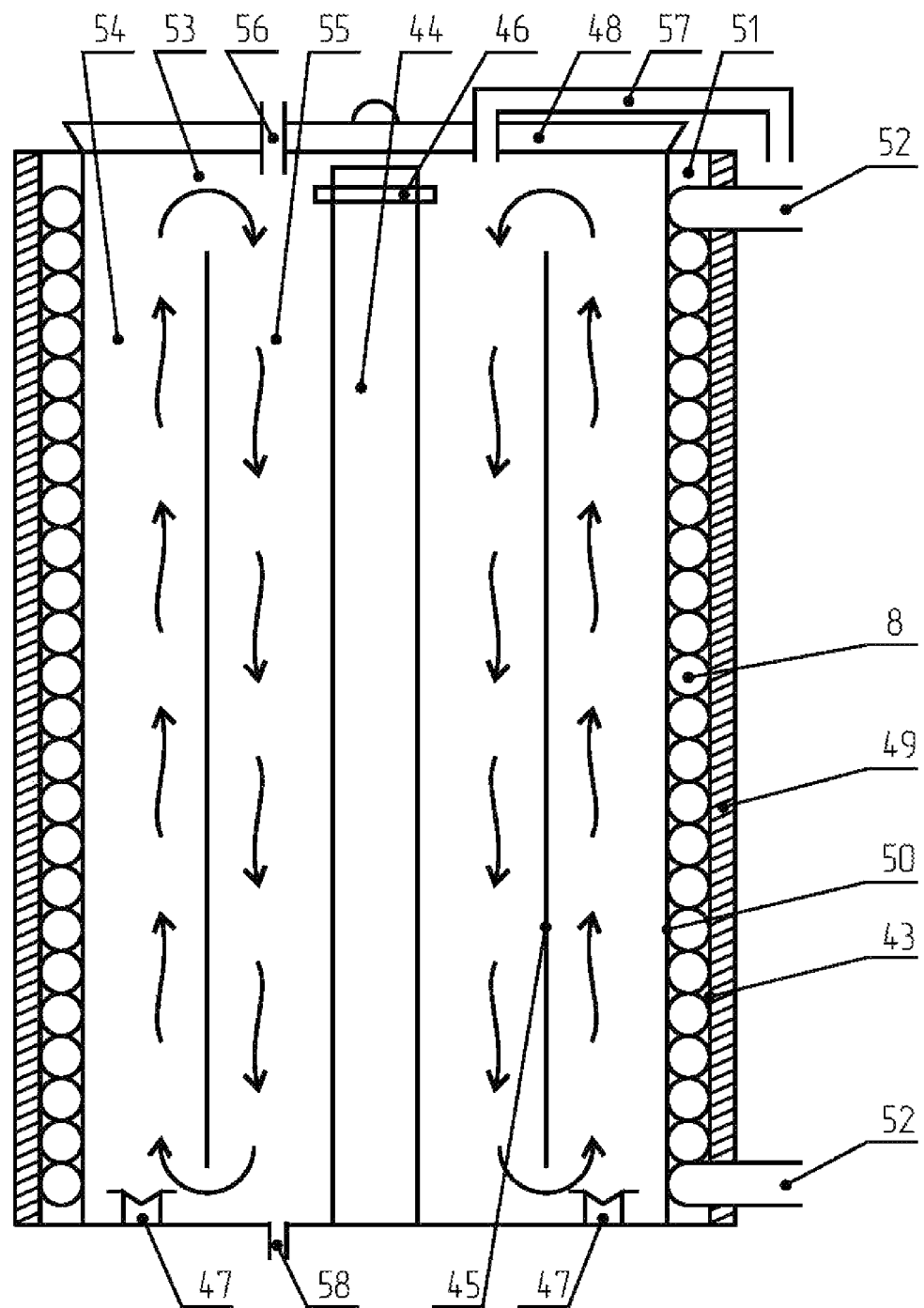
FIG. 2 depicts a schematic diagram of the heat-exchange device according to the first embodiment with the outer cylindrical housing.
Figure 3:
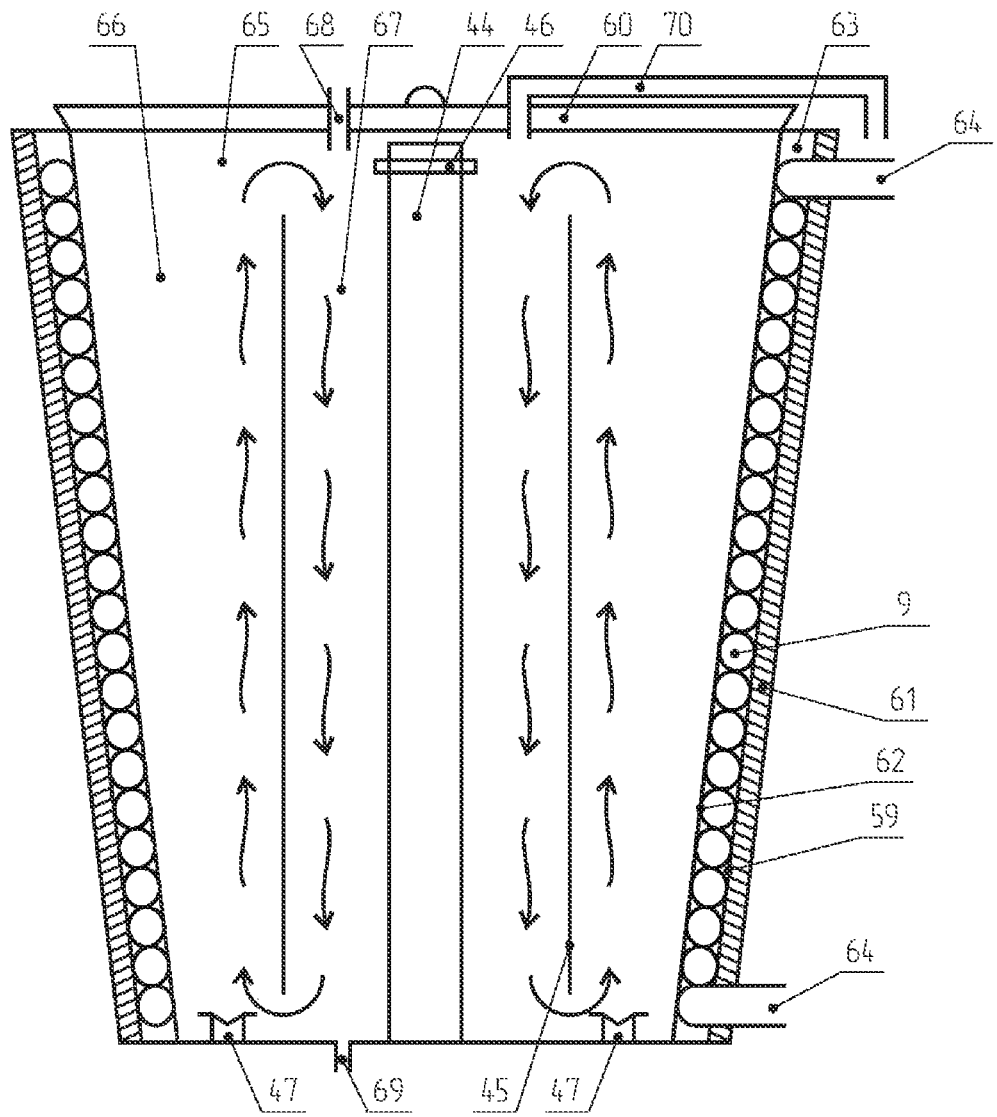
FIG. 3 depicts a schematic diagram of the heat-exchange device according to the second embodiment with the truncated cone-shaped outer housing with a cone angle directed upwards.

The most efficient application of the recrystallization water treatment system is ensured by heat-exchange devices according to the first embodiment of their design that features cylindrical outer housing (FIG. 2) and the truncated cone-shaped hollow outer housing with a cone angle directed upwards by the second embodiment (FIG. 3).

The heat-exchange device according to the first embodiment with the outer cylindrical housing (FIG. 2, cross section of the device).

The heat-exchange device according to the first embodiment comprises the outer cylindrical housing 43 and the inner cylindrical housing 44, the cylindrical baffle 45, cooling and heating components 8, the heating component 46, epy air supply manifold 47, the cover 48 and the heat-insulation coating 49 located on the outer surface of epy outer housing 43.

The ratio of the height of the outer housing 43 to its diameter is 1.5 to 1.7 that ensures optimal operating parameters. The outer housing 43 contains the inner cylindrical wall 50, the height of which corresponds to the height of outer housing 43. The cavity 51 between the outer housing 43 and the inner wall 50 is filled with non-freezing heat-conducting substance, in which cooling and heating components 8 are located, made as a coil-shaped refrigerant evaporator-condenser with nozzles 52 for connection with the refrigerant circulation loop.

Heat-reflecting coating (not shown) is fastened on the inner surface of the outer housing 43 upstream cooling and heating elements 8.

Depending on the operating mode of the heat-exchange device, either boiling refrigerant (freezing mode) or condensing refrigerant (thawing mode) circulates in cooling and heating elements 8.

The inner housing 44 is located coaxially with the outer housing 43 and is made with closed end surfaces. Location of the inner housing 44 inside the outer housing 43 allows to form a ring-shaped chamber 53 between their adjacent walls thus significantly decreasing the freezing stage duration. Simultaneously, the inner housing 44 is a displacer that decreases the volume of initial water in the chamber 55 which also decreases the freezing step duration. The height of the inner housing 44 corresponds to the height of the outer housing 43.

The baffle 45 is installed in the chamber 53 between outer and inner housings 43 and 44, correspondingly, and forms cooling and recirculation cavities 54 and 55, correspondingly, that intercommunicate between each other under baffle 45 and over it.

The height of baffle 45 is 0.8 to 0.9 of the outer housing 43 height which ensures the possibility of free water circulation in the freezing mode.

Use of baffle 45 allows to limit water crystallization front during the water freezing step in quite a narrow cooling cavity 54 which additionally decreases the step duration.

Heating component 46 is located at the top of inner housing 44; it is made as an electric heater or a refrigerant tubular condenser with the capillary tube to bleed the refrigerant hot vapour (not shown).

Manifold for air supply 47 is mounted in the bottom of outer housing 43 in cooling cavity 54. Cover 48 is able to tightly close chamber 53. Nozzle 56 for water supply and air valve 57 are installed over recirculation cavity 55 on cover 48. Nozzle 58 for draining polluted water concentrate and treated water is located in the bottom of outer housing 43 in the said cavity 55.

Outer housing 43 and inner housing 44, baffle 45 and inner wall 50 are made of heat-conductive material. At the same time, baffle 45 and inner wall 50 are equipotential surfaces: baffle 45—signed "plus" or "minus", and wall 50—signed "minus" or "plus", correspondingly, depending on the recrystallization mode.

The heat-exchange device according to the second embodiment features the truncated cone-shaped outer housing with a cone angle directed upwards (FIG. 3, cross section of the device).

The heat-exchange device according to the second embodiment comprises outer housing 59 and inner housing 44, baffle 45, cooling and heating components 9, heating component 46, manifold for air supply 47, cover 60 and heat-insulation coating 61 located on the external surface of the outer housing 59.

Inner housings 59 is made as a truncated cone with a cone angle directed upwards and comprises inner wall 62 of the same shape, the height of which corresponds to the height of outer housing 59.

Cavity 63 between outer housing 59 and inner wall 62 is filled with non-freezing heat-conducting substance, in which cooling and heating components 9 are located; they are made as a coil-shaped refrigerant evaporator-condenser with nozzles 64 for connection with the refrigerant circulation loop. Heat-reflecting coating (not shown) is located on the inner surface of outer housing 59 upstream cooling and heating elements 9.

The inner hosing 44 is cylindrical-shaped with closed end faces and is located coaxially with the outer housing 59. The height of the inner housing 44 corresponds to the one of the outer housing 59.

The baffle 45 is cylindrical and is installed between the outer and inner housings 59 and 44; it forms a cooling cavity 66 and a recirculation cavity 67 correspondingly in the chamber 65. These cavities intercommunicate between each other under the baffle 45 and over it.

The baffle 45 is located coaxially with the said housings; and its height (as in the first embodiment of the heat-exchange devices, ref.) is 0.8 to 0.9 of the height of the outer housing 59 which ensures the possibility of free circulation of water during the freezing mode.

The baffle 45 ensures the technical result similar to the one of the first embodiment of the heat-exchange device considered previously with a cylindrical outer housing.

Design and location of the heating component 46, manifold 47, nozzles 68 for water supply and nozzles 69 for draining polluted water concentrate and pure water, the cover 60 and the air valve 70 are similar to their design in the first embodiment of the heat-exchange device with cylindrical outer housing.

The outer housing 59 and the inner housing 44, the baffle 45 and the inner wall 62 are made of heat-conductive material. At the same time, the baffle 45 and the inner wall 62 are equipotential surfaces.

Heat-exchange devices 1 and 2 with cylindrical 43 and conical 59 shaped outer housings are used in the system either jointly, for example, the upper device has cylindrical outer housing 43 while the lower one has conical outer housing 59, or separately—two by two devices with outer housings 43 or 59 of the same shape.

The recrystallization water treatment system claimed in the description and figures as well as heat-exchange devices 1 and 2 used in it do not delimit all possible embodiments that ensure achievement of the claimed technical result.

In particular, any paired or unpaired number of heat-exchange devices 1 and 2 with the claimed design may be used in the system; it permits to create a unified range of such devices with different output. To shorten the ice melting step, heat-exchange devices 1 and 2 may contain additional heating components, which are located, for example, in the bottom part of the heat-exchange chamber or on the inner housing wall.

Cooling and heating components in heat-exchange devices 1 and 2 may be made of other shape or design, for example, as multi-channel panels or electric thermal elements.

Operation of the recrystallization water treatment system.

In the example below, the recrystallization water treatment system contains (FIG. 1) an upper heat-exchange device 1 with a cylindrical outer housing 43 (FIG. 2) and a lower heat-exchange device 2 with a truncated cone-shaped outer housing 59 with a cone angle directed upwards (FIG. 3).

Water is treated during alternating steps of water freezing and ice melting in chambers 53 and 65 of the devices 1 and 2 for heat-exchange and for transfer of the heat generated in the chamber during water freezing into the ice melting chamber. Depending on the operating mode, either boiling refrigerant (freezing mode) or condensing one (thawing mode) circulates in cooling and heating elements 8 and 9.

A control and monitoring tool 5 implements the algorithm entered in the controller 24 on corresponding reversing of water streams in chambers 53 and 65 and refrigerant in cooling and heating components 8 and 9 as well as short-term actuation of heating components 46 and compressor (not shown) to supply air into manifolds 47 during water freezing.

Operation of the recrystallization water treatment system is explained using the example of water treatment with separation of "heavy" water in the chamber of upper heat-exchange device 1, disposal of "heavy" water, and purification of "light" water from impurities and dissolved salts in the chamber of lower heat-exchange device 2.

1. System Start. Water Supply into the Chamber 53 of the Upper Heat-Exchange Device 1.

Treatment option with heavy water separation is selected on the control panel. After the system actuation by pressing the Start button, controller 24 controls the system in automatic mode. The valve 28 opens, and initial water enters the chamber 53 of the upper heat-exchange device 1 via the filter 12 and the heat-exchange cold accumulator 41. The valve 28 closes after the chamber 53 is filled.

2. Operation of the Upper Heat-Exchange Device 1 During the Step of "Heavy" Water Freezing.

Valves 34 and 35 open automatically, valves 33 and 36 are closed. Refrigerant condenses in air-cooled and water-cooled condensers 19 and 20 during the operation of the upper heat-exchange device 1 in the course of water freezing with no water in the lower heat exchanger 2. During this step, refrigerant circulates in the loop 4 according to the direction shown by a dashed arrow in FIG. 1. Refrigerant vapour compressed in the compressor 18 passes sequentially through sections of air-cooled and water-cooled condensers 19 and 20, and the valve 35. Then, it enters cooling and heating components 9 of the lower heat-exchange device 2 via the upper nozzle 64.

Liquid refrigerant is discharged from the lower heat-exchange device 2 via the lower nozzle 64 and enters the capillary tube 23, from which it is fed in throttled condition into the heat exchanger 21. Then, it is heated up to 5° C. and fed into cooling and heating components 8 of the upper heat-exchange device 1 via the lower nozzle 52.

When passing cooling and heating components 8, refrigerant boils out and cools initial water in the chamber 53, and freezes out "heavy" ice on the inner wall 50. Refrigerant vapour is discharged from the upper heat-exchange device 1 via the upper nozzle 52 and returns to the inlet of the compressor 18 via the valve 34 and heat exchangers 21 and 22.

After completion of the pre-set period for "heavy" ice freezing on inner wall 50, valve 29 opens, following the command of the controller 24 and non-frozen part of initial water drains via this valve into the chamber 65 of the lower heat-exchange device 2; then, valve 29 closes.

3. Operation of the Upper Heat-Exchange Device 1 During "Heavy" Ice Melting and of the Lower Heat-Exchange Device 2 During "Light" Water Freezing.

Following the command of the controller 24, two valve groups simultaneously switch over: valves 33 and 36 open while valves 34 and 35 close. The lower heat-exchange device 2 starts operating in the "light" water freezing mode while the upper heat-exchange device 1—in the "heavy" ice melting mode. Controller 24 provides synchronous operation of the heat-exchange devices 1 and 2 by the set program algorithm involving the temperature control valve 38, which bridges a capillary tube 23, based on readings of the temperature sensors 25. Refrigerant circulates the in loop 4 in the direction shown by solid arrow in FIG. 1.

Refrigerant vapour compressed in the compressor 18 passes through air-cooled condenser 19 and water-cooled condenser 20, valve 33; then, it enters cooling and heating components 8 of the upper heat-exchange device 1 via the upper nozzle 52. As a result of the heat exchange with "heavy" ice on the inner wall 50, refrigerant condenses at a temperature of 20° C. The water formed during the "heavy" ice melting accumulates in the bottom part of the chamber 53.

Liquid refrigerant leaves cooling and heating elements 8 through the lower nozzle 52 and enters the heat exchanger 21, where it is cooled down to 10° C. Then, it passes through the valve 37 and the capillary tube 23, where it is throttled and enters the lower nozzle 64 of cooling and heating elements 9 located in the lower heat-exchange device 2.

The inner wall 62 in the chamber 65 is cooled from minus 3° C. to minus 35° C. As a result, "light" water is quickly cooled in the cooling cavity 66 with simultaneous formation of annular crystallization front directed from the inner wall 62 to the baffle 45.

Temperature sensors 25 monitor the temperature of "light" water during its cooling and refrigerant temperature during its heating due to heat exchange with the water.

According to the pre-set algorithm, the controller 24 does not permit critical temperature decrease in the cooling cavity 66 as it may cause crystallization of the light water residue with increased content of the organic and inorganic impurities that significantly decrease the quality of the pure water.

When cooling "light" water, its density decreases to (998.6 to 998.8) kg/m$^3$ along the inner wall 62 which causes weak natural circulation of water between adjacent cavities 66 and 67 since water density in the cavity 67 does not change and equals approx. 1 000 kg/m$^3$.

When a thin layer of ice is formed on the inner wall 62 by a command of the controller 24, the air compressor (not shown) turns on to supply compressed air in the cooling cavity 66 via the manifold 47. Then, the heating component 46 turns on for a short period at a given time point.

Air supply into the cooling cavity 66 from the bottom side and simultaneous short heating of "light" water at the top of the recirculation cavity 67 increases the intensity of its vertical circulation which contributes to faster water cooling and building up of pure and transparent ice. Simultaneously, the decrease of impurity gradient is ensured on the ice-water boundary, and ice intercrystalline contamination with salts and suspended solids decreases.

The heat-insulating coating 61 and the heat-reflecting coating located on opposite sides of the external wall of the outer housing 59 increase the efficiency of the heat transfer from cooling and heating components 9 to the bulk of water, thus decreasing the freezing mode duration in the chamber 65. Besides, the efficiency of the heat transfer increases due to filling cavity 63 with non-freezing heat-conducting substance.

Due to heat exchange with "light" water during its freezing, refrigerant heats in cooling and heating components 9 and boils out at a temperature of minus 15° C. Refrigerant vapour is fed into heat exchangers 21 and 22 via the upper nozzle 64 and the valve 36 and then to the inlet of the compressor 18.

The command of the controller 24 simultaneously opens valves 30 and 32 after completion of the "light" water freezing step on the inner wall 62 in the lower heat-exchange device 2, set by the controller. Then, the non-frozen residue of "light" water containing concentrate of impurities and salts enters the tank 13 from the chamber 65 of the lower heat-exchange device 2 via the nozzle 69 and the heat-exchange component 42, in the heat-exchange cold accumulator 41, and the valve 32. "Heavy" water enters the tank 13 from the chamber 53 of the upper heat-exchange device 1 via the nozzle 58 and the valve 30.

Excessive water is disposed from the tank 13 via the nozzle 14. Valves 30 and 32 close after draining "heavy" and "light" water from heat-exchange chambers 65 and 53. Valve 28 opens; and initial water, being cooled in the heat-exchange cold accumulator 41, enters the heat-exchange cavity 53 of the upper heat-exchange device 1 via the nozzle 56. The valve 28 closes after filling the heat-exchange cavity 53. The system is ready to change the recrystallization cycle.

4. Operation of the Upper Heat-Exchange Device 1 During Freezing of "Heavy" Ice and the Lower Heat-Exchange Device 2 During "Light" Ice Melting.

Following the command of the controller 24, two groups of valves switch simultaneously to the next recrystallization cycle: valves 34 and 35 open while valves 33 and 36 close. "Heavy" ice is frozen out of initial water on the inner wall 50 in the upper heat-exchange device 1 while "light" ice melts in the lower heat-exchange device 2 producing pure potable water. During this step, refrigerant circulates in the loop 4 according to the direction shown by the dashed arrow in FIG. 1.

Refrigerant vapour compressed in the compressor 18 passes sequentially the section of a air-cooled condenser 19 and a water-cooled condenser 20; then, it enters components 9 of the lower heat-exchange device 2 via the valve 35 and the upper nozzle 64. Here, refrigerant condenses at a temperature of +15 . . . +18° C. and melts "light" ice frozen on the inner wall 62.

Liquid refrigerant discharges from the lower heat-exchange device 2 into the capillary tube 23 via the nozzle 64, throttles in it and enters the heat exchanger 21. Here, it is heated up to 5° C. and fed into cooling and heating components 8 of the upper heat-exchange device 1 via the lower nozzle 52. Refrigerant boils out when passing the said components 8 thus cooling initial water and forming "heavy" ice on the inner wall 50. Then, refrigerant vapour discharges via the upper nozzle 52 and returns at the inlet of the compressor 18 via the valve 34 and heat exchangers 21 and 22.

The valve 31 opens, when the necessary layer of "heavy" ice is formed on the inner wall 50 of the upper heat-exchange device 1, and "light" ice melts in the heat-exchange chamber 65 of the lower heat-exchange device 2. Then, pure potable water enters the pure water tank 10 via the heat-exchange component 15 and the fine filter 16. The valve 31 closes after draining pure water from the chamber 65; the valve 29 opens, and "light" water enters the chamber 65 from the chamber 53 of the upper heat-exchange device 1 via this valve. The valve 29 closes. The system is ready for the next change of recrystallization steps in heat-exchange devices 1 and 2 when "heavy" ice will melt in the upper heat-exchange device 1, and "light" water will freeze in the lower heat-exchange device 2. The specified mode is considered above (cycle 3).

During the system operation, pure potable water is collected in the tank 10 and is cooled by the heat exchanger 22. The level sensor 27 and the temperature sensor 26 control the level and temperature of the treated water in the tank 10. Treated potable water is fed to a consumer from the tank 10 through the valve 17.

Next, let us consider the operation of the recrystallization water treatment system when using the electrolysis effect during water freezing.

The electrolysis effect is used to treat highly contaminated water, which is formed in cooling cavities 54 and 66, between equipotential surfaces formed by the baffle 45 and the inner wall, correspondingly, 50 and 62, after their connection to an external direct current source. In this case, the baffle 45 is connected to a positive terminal while the said internal walls—to a negative terminal or vice versa, taking into account the change of recrystallization steps.

Depending on the initial water contamination rate and climatic conditions, the duration of water freezing stage in heat-exchange devices 1 and 2 is 0.2 hours to 1.5 hours while the ice melting stage lasts 0.5 hours.

The claimed design of the recrystallization water treatment system and heat-exchange devices 1 and 2 was checked during the treatment of polluted and sea water (with salt content up to 4.5%). Test results have confirmed the claimed test result.

In particular, the application of a heat-exchange accumulator allows shortening the water cooling and ice melting stages in the upper heat-exchange devices by 24% to 32%. Use of a water-cooled condenser allows decreasing the refrigerant condensation point from about 40° C. to about 30° C. thus increasing the compressor refrigeration capacity and shortening the freezing step in upper and lower heat-exchange devices. Application of the electrolysis effect during water freezing allows decreasing the unwanted impurity content from 40% to 90%. Use of an additional heating component shortens the duration of the ice melting stage.

The combination in the system of sufficiently large performance and high quality of water treatment allows using it for treating initial water with a wide range of with organic and inorganic contaminants.

The claimed design of the recrystallization water treatment system ensures the achievement of the required technical result.

In particular, cascade arrangement of heat-exchange devices 1 and 2 one under another and their having one chamber for water freezing and ice melting permits to significantly simplify the layout of the water circulation loop compared to the known technical solution due to exclusion of tools for forced circulation and due to parallel chamber connection.

The possibility to separate chambers 6 and 7 into intercommunicated cooling and recirculation cavities with the possibility of water circulation between them allows to increase the convective process intensity during the freezing stage and to simultaneously improve ice quality on the inner surface of the housing and, correspondingly, to improve the quality of the treated water produced by ice melting.

Besides, the possibility to separate chambers 6 and 7 into intercommunicated cooling and recirculation cavities permits to narrow down the area, in which an annular crystallization front is formed, and, due to this, to shorten the duration of the freezing stage.

The possibility to form equipotential surfaces in the cooling cavity permits to use an additional electrolysis effect during water freezing and, due to this, to significantly improve ice quality.

The refrigerant circulation loop with additional air-cooled condenser and new interconnections between heat exchangers are directed towards the implementation of the claimed system, and simultaneously they allow decreasing nonproductive losses of heat energy emitted during water freezing and ice melting in the chambers of heat-exchange devices and, correspondingly, reducing operating costs for water treatment.

The claimed design of the heat-exchange device also provides attaining the required technical result.

In particular, the annular chamber with a cylindrical baffle, fastened so as to form cooling and recirculation cavities intercommunicated between each other under the baffle and over it, allows to improve the efficiency of the heat transfer from the walls of the outer housing to the water thus shortening the freezing stage. Simultaneously, this design allows to increase the outer housing volume and, correspondingly, the pure water output per one treatment cycle.

Use of a heating component fastened at the top of the inner housing and an air supply manifold on the bottom of the outer housing in the cooling cavity allows to increase the convective process intensity in the water and, correspondingly, shorten the ice formation stage. At the same time, an increase in the convective process intensity simultaneously improves the quality of ice on the inner surface of the outer housing and, accordingly, the quality of treated water produced by melting of such ice.

What is claimed is:

1. Recrystallization water treatment system that contains at least two heat-exchange devices with chambers for water freezing and ice melting, cooling and heating components, a water circulation loop, which is connected with the chambers of the heat-exchange devices capable of draining pretreated water from one chamber and supplying it to another one for final treatment; a refrigerant circulation loop connected with cooling and heating components capable of alternating water freezing and ice melting steps in chambers of the heat-exchange devices and transfer of the heat of the refrigerant formed in the chamber during water freezing into the ice melting chamber; and a control and monitoring tool connected with the water and refrigerant circulation loops and capable of reversing water and refrigerant streams during alternating water freezing and ice melting steps; thereat, the water circulation loop contains a tool for the initial water supply, a tool for draining polluted water concentrate, a tool for draining pre-treated water, a tool for draining treated water, a pure water tank, and the tank for polluted water concentrate; while the refrigerant circulation loop contains a compressor, a water-cooled condenser that exchanges heat with the tank for polluted water concentrate after its draining from heat-exchange chambers, and two heat exchangers; wherein heat-exchange devices are cascaded one under another, and each device contains one chamber configured to divide it into intercommunicated cooling and recirculation cavities; and to circulate water between the intercommunicated cooling and recirculation cavities forming equipotential surfaces in the cooling cavity during water freezing; the refrigerant circulation loop contains an additional air-cooled condenser, the inlet and outlet of which are connected with the compressor outlet and with the inlet of the water-cooled condenser, correspondingly;

thereat the inlet of the first heat exchanger is connected with inlets and outlets of cooling and heating components while its outlet is connected with the inlet of the second heat exchanger, the outlet of which exchanges heat with the pure water tank and is connected with the compressor inlet;

the chamber of an upper heat-exchange device is connected at the inlet with the tool for the initial water supply and at the outlet it is connected with the tool for draining polluted water concentrate and the tool for draining the pre-treated water; the chamber of a lower heat-exchange device is connected at the inlet with the tool for draining the pre-treated water from the chamber of the upper heat-exchange device and at the outlet it is connected with the tool for draining polluted water concentrate and the tool for draining pure water;

the tool for initial water supply contains upstream the chamber of the upper heat-exchange device a heat-exchange component which is located in a thermal accumulator, and a coarse filter;

a tool for draining polluted water concentrate contains the tank for polluted water concentrate downstream the chamber of the upper heat-exchange device, which exchanges heat with the water-cooled condenser, and a drain nozzle; the tool for draining polluted water concentrate and the tool for draining pure water have common outlet from the chamber of the lower heat-exchange device and contain common heat-exchange component in the heat-exchange accumulator downstream the said chamber;

along the path of polluted water concentrate, they contain the tank for polluted water concentrate and a drain nozzle;

they contain the second heat-exchange component along the pure water path located in the water-cooled condenser, a fine filter and a sterilization lamp; and the pure water tank contains a shut-off valve to control water supply to a consumer.

2. The system for recrystallization water treatment of claim 1, wherein the control and monitoring tool is capable of separating initial water in the chamber of the upper heat-exchange device into heavy and light water; threat heavy water is removed via the tool for draining polluted water concentrate while light water is supplied in the chamber of the lower heat-exchange device via the tool for draining pre-treated water.

3. The system for water treatment of claim 1, wherein the control and monitoring tool comprises a controller and control valves connected with it and installed in water and refrigerant circulation loops, temperature sensors installed at inlets and outlets of cooling and heating components and in the pure water tank, and a water level sensor installed in the pure water tank; threat control valves are water and refrigerant solenoid valves.

4. The system for water treatment of claim 1, wherein it comprises a heat-exchange accumulator that exchanges heat with initial water supplied into the chamber of the upper heat-exchange device and with polluted water concentrate and pure water when they are supplied from the chamber of the lower heat-exchange device while the water-cooled condenser additionally exchanges heat with pure water supplied from the heat-exchange accumulator.

5. The heat-exchange device for the recrystallization water treatment system, which contains a truncated cone-shaped outer housing with a cone angle directed upwards, an inner housing, which is located inside the outer housing along its longitudinal axis, forming a cavity between their walls and having closed end faces, cooling and heating components located on the outer housing, a drain nozzle and a cover to lock the outer housing, wherein the heat-exchange device is equipped with a cylindrical baffle installed in the cavity between the walls of the inner and outer housings and forming cooling and recirculation cavities that intercommunicate between each other under the baffle and over it, an air supply manifold and a heating component, threat, the inner housing is cylindrical, the baffle is located coaxially with the outer and inner housing, the air supply manifold is installed on the outer housing bottom in the cooling cavity while the heating component is installed at the top of the inner housing, wherein the height of the inner housing corresponds to the height of the outer housing, wherein the baffle and the inner wall of the housing are configured to be connected to an electrical current source.

6. The heat-exchange device of claim 5, wherein the outer housing has an additional inner wall, the shape and height of which correspond to the outer housing while cooling and heating components are located between the said walls.

7. The heat-exchange device of claim 5, wherein the height of the baffle is 0.8 to 0.9 of the height of the outer housing.

* * * * *